US009716625B2

(12) United States Patent
Song et al.

(10) Patent No.: US 9,716,625 B2
(45) Date of Patent: Jul. 25, 2017

(54) IDENTIFYING COMPATIBLE SYSTEM CONFIGURATIONS

(71) Applicant: International Business Machines Corporation, Armonk, NY (US)

(72) Inventors: Yang Song, San Jose, CA (US); Aameek Singh, Univerity Place, WA (US); Thomas D. Griffin, Campbell, CA (US); Eric Butler, Long Beach, CA (US); Divyesh Jadav, San Jose, CA (US); Nagapramod Mandagere, San Jose, CA (US); Gabriel Alatorre, Long Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 14/049,634

(22) Filed: Oct. 9, 2013

(65) Prior Publication Data

US 2015/0100671 A1    Apr. 9, 2015

(51) Int. Cl.
*G06F 15/177* (2006.01)
*H04L 12/24* (2006.01)
*H04L 12/911* (2013.01)

(52) U.S. Cl.
CPC ............ *H04L 41/082* (2013.01); *H04L 41/12* (2013.01); *H04L 47/829* (2013.01)

(58) Field of Classification Search
CPC ... H04L 41/12; H04L 43/0811; H04L 41/082; H04L 47/829
See application file for complete search history.

(56) References Cited

U.S. PATENT DOCUMENTS

| 8,375,380 B2 | 2/2013 | Shahidzadeh et al. |
| 8,874,704 B2 * | 10/2014 | Nath .................... H04L 41/0843 709/220 |
| 2006/0265471 A1 | 11/2006 | Pitzel et al. |
| 2009/0262664 A1 * | 10/2009 | Leighton ................. H04L 41/12 370/254 |

(Continued)

OTHER PUBLICATIONS

Mastrorilli et al., Reporting with TPCTOOL, Aug. 2007.

(Continued)

*Primary Examiner* — Yves Dalencourt
(74) *Attorney, Agent, or Firm* — Ryan, Mason & Lewis, LLP (57) ABSTRACT

Methods, systems, and articles of manufacture for identifying compatible system configurations are provided herein. A method includes generating a second graph from a first graph of multiple devices in a network and a set of one or more network compatibility rules, wherein said generating comprises dividing each device in the first graph into multiple nodes in the second graph, and wherein each node in the second graph represents a valid configuration of a device in the first graph; identifying a sub-graph of two or more linked nodes in the second graph that is isomorphic to at least a portion of the first graph, wherein the two or more linked nodes in the second graph represent two or more configurations that are compatible based on the set of one or more network compatibility rules; and determining each of one or more changes needed to convert a current configuration in the network to a target configuration specified by the sub-graph.

13 Claims, 6 Drawing Sheets (56) References Cited

U.S. PATENT DOCUMENTS

| | | | |
|---|---|---|---|
| 2011/0239189 A1* | 9/2011 | Attalla | G06F 8/65 717/121 |
| 2012/0054731 A1* | 3/2012 | Aravamudan | G06F 8/63 717/170 |
| 2012/0151026 A1* | 6/2012 | Chen | H04L 41/12 709/223 |
| 2013/0055155 A1* | 2/2013 | Wong | G06F 8/65 715/810 |
| 2014/0136690 A1* | 5/2014 | Jain | H04L 41/0826 709/224 |

OTHER PUBLICATIONS

IBM SSIC: http://www-03.ibm.com/systems/support/storage/ssic/interoperability.wws, accessed Sep. 7, 2013.
Ullman, An Algorithm for Subgraph Isomorphism, Journal of the ACM, 1976.
Conte et al., Thirty Years of Graph Matching in Pattern Recognition, International Journal of Pattern Recognition and Artificial Intelligence, 2004.
Messmer, Efficient Graph Matching Algorithms, Ph.D. Dissertation, 1995.

* cited by examiner

IDENTIFYING COMPATIBLE SYSTEM CONFIGURATIONS

FIELD OF THE INVENTION

Embodiments of the invention generally relate to information technology, and, more particularly, to system compatibility management.

BACKGROUND

Typical data center networks include multiple interconnected devices with heterogeneous configurations, wherein compatibility issues may arise. For example, a storage fabric switch with a firmware level may not be compatible with a driver version on a host server attached to the switch. Compatibility requirements can impose a significant challenge to system administrators (admins) that are planning system upgrades. For instance, if the above-noted storage fabric switch in the network has a firmware level that is below the recommended level, a system upgrade is required to change the firmware level to the desired level. However, such a system change may introduce compatibility issues because the new firmware level may not be compatible with the configuration setting of an adjacent device. Therefore, an additional system upgrade (for the adjacent device which becomes incompatible after upgrading the first device) needs to be executed to maintain the network-wide compatibility requirement.

Accordingly, challenges exist in capturing the complexity of a single system upgrade which prevents the system admin from performing a "what-if" analysis to plan system upgrades. Additionally, interconnectivity and interdependency among devices complicate the problem significantly, and attempts at obtaining a network-wide compatible configuration solution and/or upgrade plan currently include manual checking and enumerations. Further, the complexity of such manual processes grow exponentially when more devices are interconnected and more firmware upgrade options are available in the data center devices, due to the combinatorial nature of such additions.

Consequently, a need exists for determining feasibility of a network-wide compatible configuration, given network and compatibility information.

SUMMARY

In one aspect of the present invention, techniques for identifying compatible system configurations are provided. An exemplary computer-implemented method can include steps of generating a second graph from a first graph of multiple devices in a network and a set of one or more network compatibility rules, wherein said generating comprises dividing each device in the first graph into multiple nodes in the second graph, and wherein each node in the second graph represents a valid configuration of a device in the first graph; identifying a sub-graph of two or more linked nodes in the second graph that is isomorphic to at least a portion of the first graph, wherein the two or more linked nodes in the second graph represent two or more configurations that are compatible based on the set of one or more network compatibility rules; and determining each of one or more changes needed to convert a current configuration in the network to a target configuration specified by the sub-graph.

In another aspect of the invention, an exemplary computer-implemented method can include steps of generating a second graph from a first graph of multiple devices in a network and a set of one or more network compatibility rules, wherein said generating comprises dividing each device in the first graph into multiple nodes in the second graph, and wherein each node in the second graph represents a valid configuration of a device in the first graph; and identifying multiple sub-graphs of two or more linked nodes in the second graph that are isomorphic to one or more portions of the first graph, wherein the linked nodes in the second graph represent two or more configurations that are compatible based on the set of one or more network compatibility rules. The noted method also includes steps of generating a upgrade plan corresponding to each of the multiple identified sub-graphs, wherein each upgrade plan is based on each of one or more changes needed to convert a current configuration in the network to a target configuration specified by the corresponding sub-graph in the second graph; computing a cost associated with each upgrade plan via a cost function; selecting one or more of the upgrade plans based on the computed cost associated with each upgrade plan; and outputting the one or more selected upgrade plans.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes identifying compatible system configurations for information technology (IT) upgrades. At least one embodiment of the invention includes determining whether a network-wide compatible configuration is feasible, given the network and compatibility information, and selecting an optimal configuration if multiple system-wide compatible solutions are available.

Figure 1:
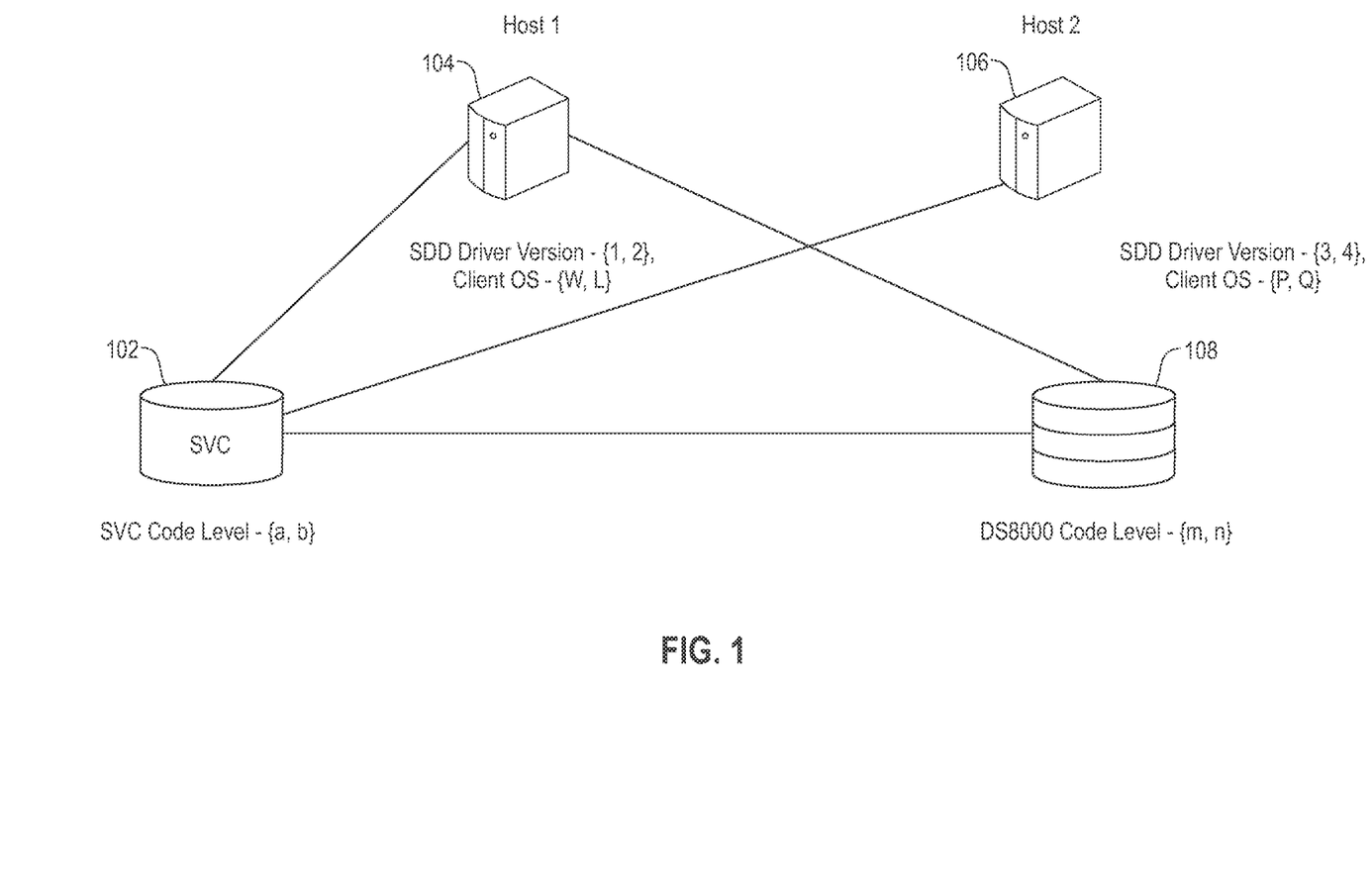
FIG. 1 is a diagram illustrating an example network connectivity graph (NG), according to an embodiment of the present invention.

FIG. 1 is a diagram illustrating an example network connectivity graph (NG), according to an embodiment of the present invention. By way of illustration, FIG. 1 depicts a SAN volume controller (SVC) 102, an adjacent device 104 (identified as Host1), another adjacent device 106 (identified as Host2), and a storage device 108 (identified as DS8000). At least one embodiment of the invention includes performing graph analysis on an auxiliary graph referred to herein as a compatibility graph (CG), which is generated from an original network connectivity graph (NG), as illustrated in FIG. 1, and an available compatibility rule list.

For each device in the NG, at least one embodiment of the invention includes dividing each node into multiple nodes on the CG, wherein each new node in the CG represents a configuration aspect of the device. For example, if the storage virtualization controller appliance, denoted by SVC 102 in FIG. 1, has two possible configurations, denoted as a and b, at least one embodiment of the invention includes dividing the SVC node (in the NG) into two nodes in the CG, represented by node a 202 and node b 204, as illustrated in FIG. 2.

Additionally, at least one embodiment of the invention includes listing all possible device configurations (one in each node) in the CG, and checking the compatibility rule list and/or database for each pair of nodes in the CG that are from two devices. Note that each pair of nodes represents two configurations of the two devices. Accordingly, a link can be drawn between the two nodes (in the CG) if the two representing configurations are compatible. In accordance with the illustration set forth in FIG. 1, Host1 (device 104) has four possible configurations: (1, w), (2, w), (1, L) and (2, L). It is noted that all possible configurations are enumerated as new nodes in FIG. 2. Similarly, Host2 (device 106) and DS8000 device 108 have four and two feasible configurations, respectively. Again, all possible configurations are enumerated as nodes in FIG. 2.

In at least one embodiment of the invention, the above process iterates until all pairs of nodes (that is, configurations) in the CG are checked. FIG. 2 illustrates an example of the constructed CG using the above-noted steps for the network shown in FIG. 1, according to the compatible rule list depicted in FIG. 3.

Figure 2:
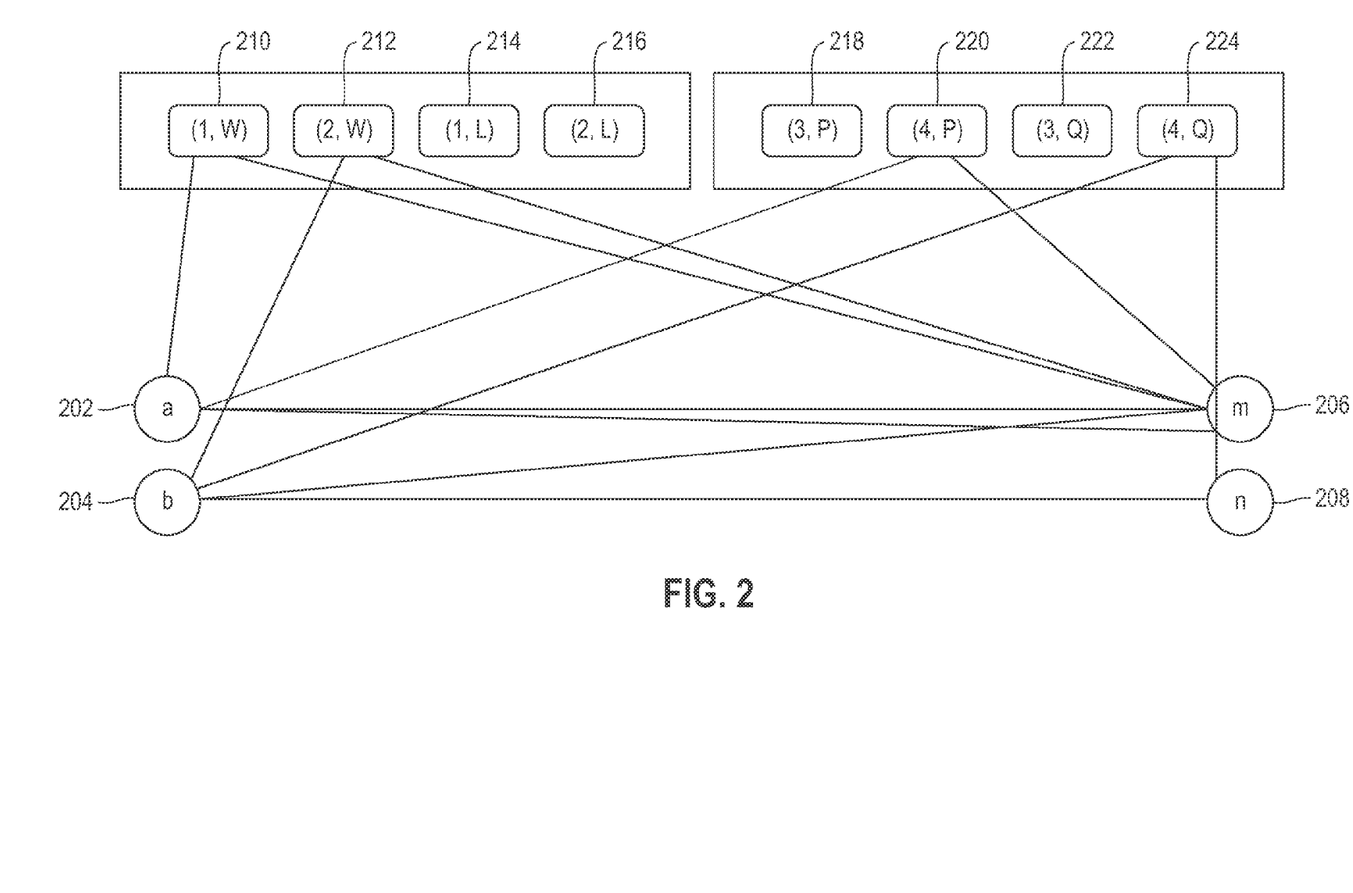
FIG. 2 is a diagram illustrating an example compatibility graph (CG), according to an embodiment of the invention.

FIG. 2 is a diagram illustrating an example compatibility graph (CG), according to an embodiment of the invention. In conjunction with the description above, FIG. 2 depicts nodes in the CG, represented by node a 202, node b 204, node m 206 and node n 208. As referenced above in connection with FIG. 1, the additional numbered components (that is, component 210, component 212, component 214, component 216, component 218, component 220, component 222, and component 224) are feasible configurations of other devices. Each of these numbered components (that is, each node in the graph) represents one feasible configuration for one device. Each dashed rectangle (encompassing a group of four enumerated components) denotes a group whereby all configurations within that group belong to one device detailed in FIG. 1.

Figure 3:
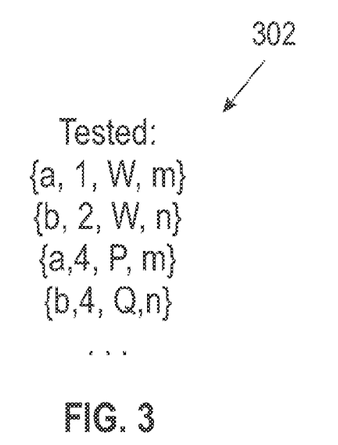
FIG. 3 is a diagram illustrating an example rule list of compatible configurations, according to an embodiment of the invention.

FIG. 3 is a diagram illustrating an example rule list 302 of compatible configurations, according to an embodiment of the invention. As detailed above, the compatible rule list 302 depicted in FIG. 3 is used to construct the CG depicted in FIG. 2. Note that the rule list 302 can be obtained, for example, from device manufacturers and/or by querying interoperation databases wherein compatibility results have been pre-tested.

Figure 4:
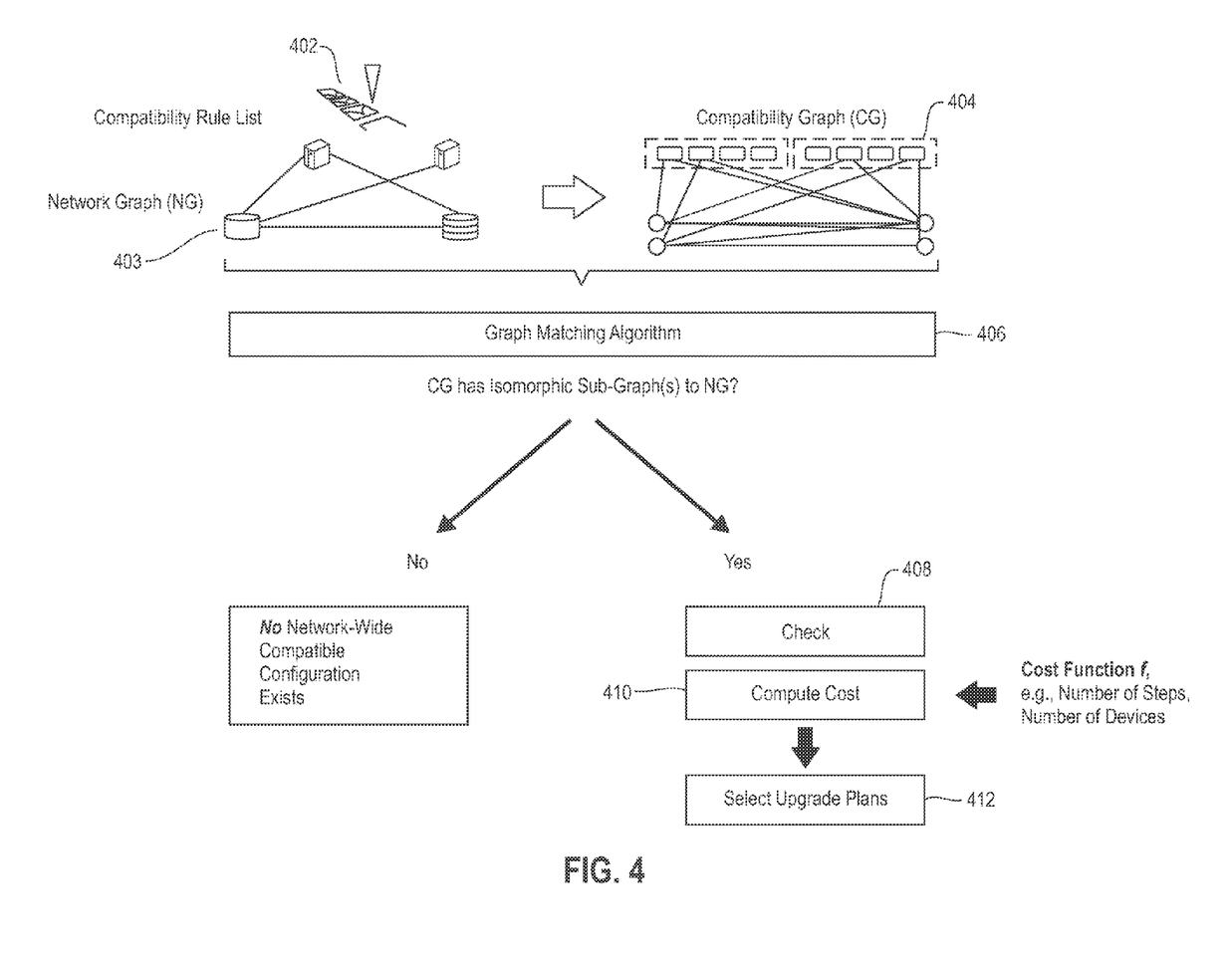
FIG. 4 is a diagram illustrating an example embodiment of the invention.

FIG. 4 is a diagram illustrating an example embodiment of the invention. By way of illustration, FIG. 4 depicts an NG 403 (such as depicted in FIG. 1, for example) and a compatibility rule list 402 (such as depicted in FIG. 3, for example), which are used in combination to construct a CG (such as depicted in FIG. 2, for example) 404.

As detailed herein, at least one embodiment of the invention includes constructing an auxiliary CG. Additionally, a compatibility checking problem is converted to a graph theoretical problem, thereby enabling application of graph matching algorithms on this constructed auxiliary graph (as discussed below) to answer questions, such as the existence of network-wide compatible solutions, in a unified graph theoretical framework. Accordingly, given an NG 403, the sets of configurations of all devices therein, and a compatibility rule database 402, an example embodiment of the invention includes creating an auxiliary CG 404 via the following steps.

As noted herein, each node in the NG 403 is divided into multiple nodes in the CG 404, wherein each node in the CG 404 denotes a valid configuration (that is, the code levels that satisfy the recommended levels) of a single device in the NG 403. For example, in FIG. 1, the device labeled SVC 102 has two possible configurations available, denoted by a and b. Correspondingly, two nodes are created in a CG representing configuration a and configuration b of the device, as shown in FIG. 2. Similarly, in FIG. 1, Host1 (104) and Host2 (106) are divided into four nodes because there are two driver levels and two operating system (OS) levels (that is, four possible configuration combinations of each device). Further, in at least one embodiment of the invention, the above-noted process is repeated for all devices in the NG to generate all nodes in the CG.

For each pair of nodes in the CG 404 that are created from two devices in the NG 403, at least one embodiment of the invention includes determining whether this pair of configurations is compatible by verifying the compatibility rule list 402, for example, via a database such as a system storage interoperation center (SSIC) database. A link is drawn between two nodes if they are compatible. For example, suppose the compatibility rule list 402 indicates that the {a, 1, W, m} configuration setting is compatible; as such, a link would be drawn between a and (1, W), between (1, W) and m, as well as between a and m, as illustrated in FIG. 2. In at least one embodiment of the invention, this process is repeated for all pairs of configurations (from two devices in the NG 403) to generate all links in the CG 404.

Referring back to FIG. 4, a graph matching algorithm 406 is applied to determine if the CG 404 has any isomorphic sub-graph(s) with respect to the NG 403. If no (that is, the CG 404 does not have any isomorphic sub-graph(s) with respect to the NG 403), then no network-wide compatible configuration exists. A graph is said to be isomorphic to another graph if the two graphs (or portions thereof) share some same graph structure. Accordingly, based on the auxiliary graph CG 404, to determine whether a network-wide compatible configuration is feasible, at least one embodiment of the invention includes applying a graph matching algorithm 406 to identify whether there exists a sub-graph in the CG 404 that is isomorphic to the NG 403. If no such sub-graphs are found, it can be asserted that no network-compatible configuration is available (that is, the network-wide compatible configuration problem is not feasible).

By constructing the CG 404 as detailed above, one or more configuration solutions are captured by a sub-graph in the CG 404, which (a) contains one node from each device, and (b) any two nodes (representing two configurations of two devices) that have a link between them if the two devices are connected in the NG 404. Accordingly, a network-wide compatible configuration solution is represented by a sub-graph in the CG 404 that is isomorphic to the NG 403. As such, graph matching algorithms are applied, as noted above.

Again referring back to FIG. 4, if the CG 404 does have one or more isomorphic sub-graphs to the NG 403, a check is carried out in step 408 for each sub-graph in that CG 404 that is isomorphic to the NG 403 to determine whether the sub-graph represents a valid system upgrade plan. Such a determination can be made, for example, by verifying whether each device has only one configuration in this sub-graph, and pair-wise compatibility is achieved for each pair of interconnected devices in the NG. This step is applied to filter out sub-graphs in the CG 404 that are isomorphic to the NG 403 yet invalid for the relevant problem setting. In accordance with at least one embodiment of the invention, all valid sub-graphs can be maintained in a list denoted by S.

Additionally, for each sub-graph in S, at least one embodiment of the invention includes creating an upgrade plan by identifying the one or more changes needed to convert the current network configuration to the target configuration specified by the sub-graph. An example of such an upgrade plan can include: {SVC: change a→b; DS8000: change m→n; . . . }.

Subsequently, step 410 includes computing a cost associated with each upgrade plan with a predefined cost function. A cost function might include, by way of example, the number of devices affected by the upgrade plan, the number of upgrade steps in the plan, and/or the estimated upgrade time (for instance, the aggregate time of individual upgrade steps).

Further, step 412 includes selecting upgrade plans based on the computed cost. To select a configuration (for instance, the best or most optimal configuration) if multiple network-wide compatible configuration solutions are available, at least one embodiment of the invention includes executing a cost function to capture the impact of every upgrade plan, from the network configuration to each of the target network-wide compatible configuration. Additionally, such an embodiment includes outputting all or a sub-set of the results as the available candidate upgrade plans. The output can include, for example, the upgrade plan with the lowest cost, a sub-set of multiple upgrade plans that satisfy a system administrator's specifications (for example, displaying all upgrade plans having an aggregate time of less than five hours), etc.

Further, in accordance with one or more embodiments of the invention, graph theoretical analysis on constructed CGs can incorporate multiple constraints. For example, if the system admin is performing a what-if analysis upon the action of upgrading a device from configuration x to configuration y, all other configurations (except y) of the device, as well as their associated links, will be removed from the CG and the previous graph analysis can be performed on the residual graph. As another example, if the system admin requires that a certain set of devices cannot be upgraded or modified, at least one embodiment of the invention includes filtering out the solutions that violate this requirement before returning the list of valid upgrade plans.

Figure 5:
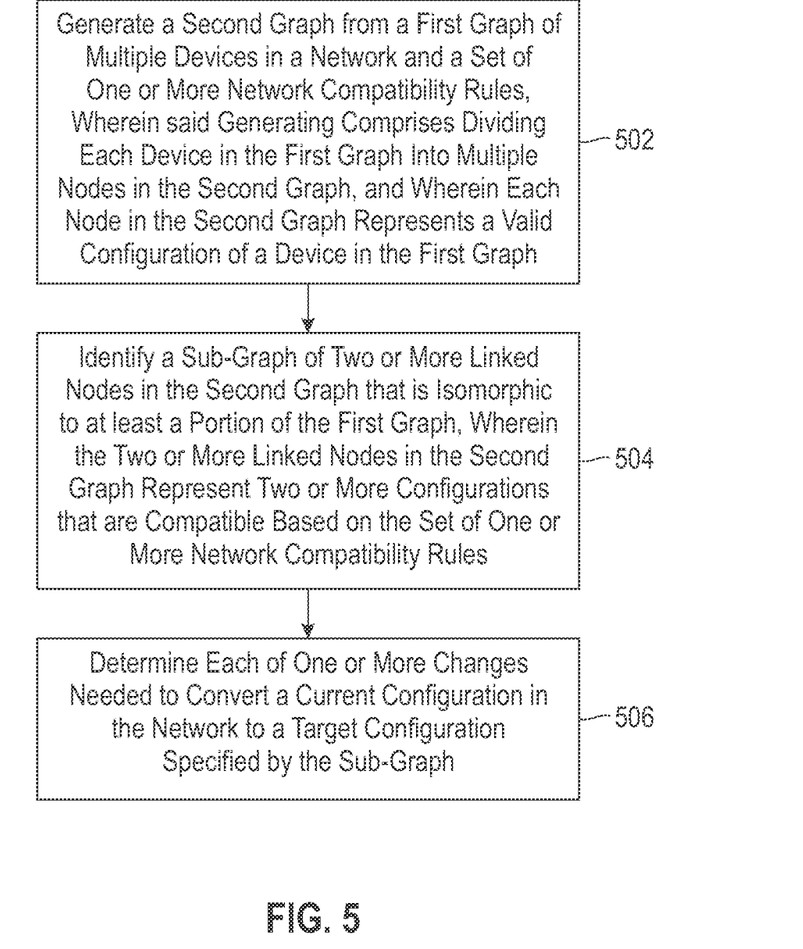
FIG. 5 is a flow diagram illustrating techniques according to an embodiment of the invention.

FIG. 5 is a flow diagram illustrating techniques according to an embodiment of the invention. Step 502 includes generating a second graph (for example, a compatibility graph) from a first graph (for example, a network connectivity graph) of multiple devices in a network and a set of one or more network compatibility rules, wherein said generating comprises dividing each device in the first graph into multiple nodes in the second graph, and wherein each node in the second graph represents a valid configuration of a device in the first graph. At least one embodiment of the invention includes repeating the dividing step for all devices in the first graph.

Step 504 includes identifying a sub-graph of two or more linked nodes in the second graph that is isomorphic to at least a portion of the first graph, wherein the two or more linked nodes in the second graph represent two or more configurations that are compatible based on the set of one or more network compatibility rules. The identifying step can include applying a graph matching algorithm to the first graph and the second graph. Additionally, this identifying step can include incorporating one or more constraints Step 506 includes determining each of one or more changes needed to convert a current configuration in the network to a target configuration specified by the sub-graph. At least one embodiment of the invention additionally includes creating an upgrade plan based on the one or more changes needed to convert the current configuration in the network to the target configuration specified by the sub-graph. Further, one or more embodiments of the invention include computing a cost associated with the upgrade plan via a cost function. By way of example, a cost function can include the number of devices in the network affected by the upgrade plan, the number of upgrade steps specified in the upgrade plan, and/or an estimated upgrade time required to execute the upgrade plan.

The techniques depicted in FIG. 5 can also include determining, for each pair of nodes in the second graph that are derived from two devices in the first graph, whether the pair is compatible based on the set of one or more network compatibility rules. In at least one embodiment of the invention, this step can be repeated for each pair of nodes derived from two devices in the first graph.

Further, the techniques depicted in FIG. 5 can include determining that the sub-graph in the second graph corresponds to a valid upgrade plan. This can include, for example, verifying that each device has only one configuration in the sub-graph and/or verifying that pair-wise compatibility is achieved for each pair of interconnected devices in the first graph.

As detailed herein, at least one embodiment of the invention can also include identifying multiple sub-graphs of two or more linked nodes in the second graph that are isomorphic to one or more portions of the first graph, wherein the linked nodes in the second graph represent two or more configurations that are compatible based on the set of one or more network compatibility rules. Further, such an embodiment can additionally include generating an upgrade plan corresponding to each of the multiple identified sub-graphs, wherein each upgrade plan is based on each of one or more changes needed to convert a current configuration in the network to a target configuration specified by the corresponding sub-graph in the second graph. Also, such an embodiment can include computing a cost associated with each upgrade plan via a cost function, selecting one or more of the upgrade plans based on the computed cost associated with each upgrade plan, and outputting the one or more selected upgrade plans.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 6:
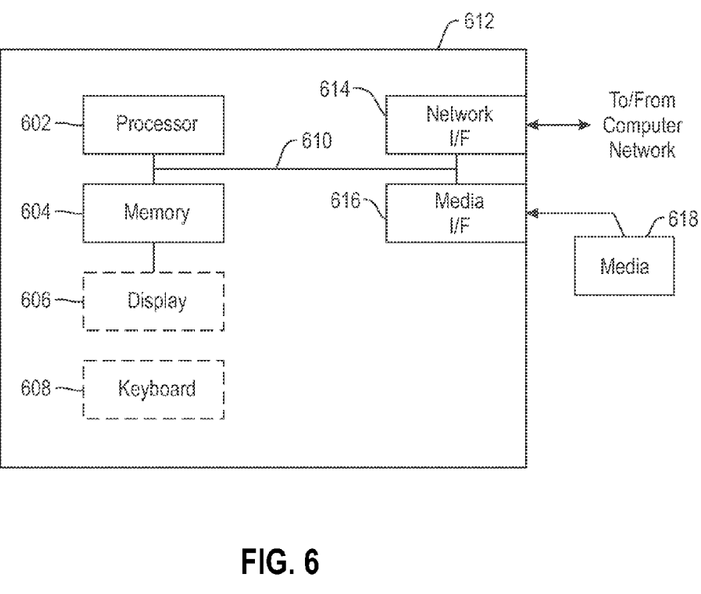
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determining existence of a network-wide compatible configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating a second graph from (i) a first graph of multiple devices in a network and (ii) a set of one or more network compatibility rules, wherein said generating comprises dividing each device in the first graph into multiple nodes in the second graph, and wherein each node in the second graph represents a valid configuration of a device in the first graph;
identifying multiple sub-graphs of two or more linked nodes in the second graph that are each isomorphic to at least a portion of the first graph, wherein the two or more linked nodes in the second graph represent two or more configurations that (i) are compatible based on the set of one or more network compatibility rules, and (ii) satisfy one or more constraints pertaining to device upgrades;
identifying each of the multiple sub-graphs in the second graph that corresponds to a valid upgrade plan, wherein said identifying comprises (i) verifying that each device has only one configuration in each of the multiple sub-graphs, and (ii) filtering out each of said sub-graphs that (a) is isomorphic but (b) does not satisfy a target configuration based on said verifying;
creating an upgrade plan arising from each of the remaining sub-graphs, wherein each upgrade plan is based on a determination of each of one or more changes needed to convert a current configuration in the network to said target configuration specified by the sub-graph from which the upgrade plan arises;
computing a cost associated with each of the upgrade plans via a cost function comprising at least the number of devices in the network requiring at least one configuration change under each of the upgrade plans; and
outputting a sub-set of the multiple upgrade plans that satisfy one or more pre-defined specifications based on the computed cost associated with each of the upgrade plans;
wherein the steps are carried out by at least one computing device.

2. The method of claim 1, wherein said second graph comprises a compatibility graph.

3. The method of claim 1, wherein said first graph comprises a network connectivity graph of multiple devices in the network.

4. The method of claim 1, comprising:
repeating said dividing step for all devices in the first graph.

5. The method of claim 1, wherein said identifying the multiple sub-graphs of two or more linked nodes in the second graph that are each isomorphic to at least a portion of the first graph comprises applying a graph matching algorithm to the first graph and the second graph.

6. The method of claim 1, wherein said cost function further comprises the number of upgrade steps specified in the upgrade plan.

7. The method of claim 1, wherein said cost function further comprises an estimated upgrade time required to execute the upgrade plan.

8. The method of claim 1, comprising:
determining, for each pair of nodes in the second graph that are derived from two devices in the first graph, whether the pair is compatible based on the set of one or more network compatibility rules.

9. The method of claim 8, comprising:
repeating said step of determining whether the pair is compatible, for each pair of nodes derived from two devices in the first graph.

10. The method of claim 1, wherein said identifying each of the multiple sub-graphs in the second graph that corresponds to a valid upgrade plan comprises verifying that pair-wise compatibility is achieved for each pair of interconnected devices in the first graph.

11. An article of manufacture comprising a non-transitory computer readable storage medium having computer readable instructions tangibly embodied thereon which, when implemented, cause a computer to carry out a plurality of method steps comprising:
generating a second graph from (i) a first graph of multiple devices in a network and (ii) a set of one or more network compatibility rules, wherein said generating comprises dividing each device in the first graph into multiple nodes in the second graph, and wherein each node in the second graph represents a valid configuration of a device in the first graph;
identifying multiple sub-graphs of two or more linked nodes in the second graph that are each isomorphic to at least a portion of the first graph, wherein the two or more linked nodes in the second graph represent two or more configurations that (i) are compatible based on the set of one or more network compatibility rules and (ii) satisfy one or more constraints pertaining to device upgrades;
identifying each of the multiple sub-graphs in the second graph that corresponds to a valid upgrade plan, wherein said identifying comprises (i) verifying that each device has only one configuration in each of the multiple sub-graphs, and (ii) filtering out each of said sub-graphs that (a) is isomorphic but (b) does not satisfy a target configuration based on said verifying;
creating an upgrade plan arising from each of the remaining sub-graphs, wherein each upgrade plan is based on a determination of each of one or more changes needed to convert a current configuration in the network to said target configuration specified by the sub-graph from which the upgrade plan arises;
computing a cost associated with each of the upgrade plans via a cost function comprising at least the number of devices in the network requiring at least one configuration change under each of the upgrade plans; and
outputting a sub-set of the multiple upgrade plans that satisfy one or more pre-defined specifications based on the computed cost associated with each of the upgrade plans.

12. A system comprising:
a memory; and
at least one processor coupled to the memory and configured for:
generating a second graph from (i) a first graph of multiple devices in a network and (ii) a set of one or more network compatibility rules, wherein said generating comprises dividing each device in the first graph into multiple nodes in the second graph, and wherein each node in the second graph represents a valid configuration of a device in the first graph;

identifying multiple sub-graphs of two or more linked nodes in the second graph that are each isomorphic to at least a portion of the first graph, wherein the two or more linked nodes in the second graph represent two or more configurations that (i) are compatible based on the set of one or more network compatibility rules and (ii) satisfy one or more constraints pertaining to device upgrades;

identifying each of the multiple sub-graphs in the second graph that corresponds to a valid upgrade plan, wherein said identifying comprises (i) verifying that each device has only one configuration in each of the multiple sub-graphs, and (ii) filtering out each of said sub-graphs that (a) is isomorphic but (b) does not satisfy a target configuration based on said verifying;

creating an upgrade plan arising from each of the remaining sub-graphs, wherein each upgrade plan is based on a determination of each of one or more changes needed to convert a current configuration in the network to said target configuration specified by the sub-graph from which the upgrade plan arises;

computing a cost associated with each of the upgrade plans via a cost function comprising at least the number of devices in the network requiring at least one configuration change under each of the upgrade plans; and outputting a sub-set of the multiple upgrade plans that satisfy one or more pre-defined specifications based on the computed cost associated with each of the upgrade plans.

13. A method comprising:

generating a second graph from (i) a first graph of multiple devices in a network and (ii) a set of one or more network compatibility rules, wherein said generating comprises dividing each device in the first graph into multiple nodes in the second graph, and wherein each node in the second graph represents a valid configuration of a device in the first graph;

identifying multiple sub-graphs of two or more linked nodes in the second graph that are each isomorphic to one or more portions of the first graph, wherein the linked nodes in the second graph represent two or more configurations that (i) are compatible based on the set of one or more network compatibility rules and (ii) satisfy one or more constraints pertaining to device upgrades;

identifying each of the multiple sub-graphs in the second graph that corresponds to a valid upgrade plan, wherein said identifying comprises (i) verifying that each device has only one configuration in each of the multiple sub-graphs, and (ii) filtering out each of said sub-graphs that (a) is isomorphic but (b) does not satisfy a target configuration based on said verifying;

generating an upgrade plan corresponding to each of the remaining sub-graphs, wherein each upgrade plan is based on each of one or more changes needed to convert a current configuration in the network to said target configuration specified by the corresponding sub-graph in the second graph;

computing a cost associated with each upgrade plan via a cost function comprising at least the number of devices in the network requiring at least one configuration change under each of the upgrade plans;

selecting one or more of the upgrade plans based on the computed cost associated with each upgrade plan; and outputting the one or more selected upgrade plans;

wherein the steps are carried out by at least one computing device.

* * * * *